(12) United States Patent
König et al.

(10) Patent No.: US 8,306,815 B2
(45) Date of Patent: Nov. 6, 2012

(54) SPEECH DIALOG CONTROL BASED ON SIGNAL PRE-PROCESSING

(75) Inventors: Lars König, Ulm (DE); Gerhard Uwe Schmidt, Ulm (DE); Andreas Löw, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1174 days.

(21) Appl. No.: 11/951,904

(22) Filed: Dec. 6, 2007

(65) Prior Publication Data

US 2008/0147397 A1    Jun. 19, 2008

(30) Foreign Application Priority Data

Dec. 14, 2006 (EP) .................................. 06025974

(51) Int. Cl.
*G06F 15/00* (2006.01)
*G10L 11/00* (2006.01)
*G10L 21/02* (2006.01)
*G10L 15/20* (2006.01)

(52) U.S. Cl. ................ 704/233; 704/226; 704/200

(58) Field of Classification Search .............. 704/233, 704/226, 200
See application file for complete search history.

(56) References Cited

U.S. PATENT DOCUMENTS

| | | | | |
|---|---|---|---|---|
| 5,036,538 A | * | 7/1991 | Oken et al. | 704/233 |
| 5,131,043 A | * | 7/1992 | Fujii et al. | 704/254 |
| 5,524,169 A | * | 6/1996 | Cohen et al. | 704/231 |
| 5,787,230 A | * | 7/1998 | Lee | 704/235 |
| 5,920,834 A | * | 7/1999 | Sih et al. | 704/233 |
| 5,953,701 A | * | 9/1999 | Neti et al. | 704/254 |
| 5,970,446 A | * | 10/1999 | Goldberg et al. | 704/233 |
| 6,088,669 A | * | 7/2000 | Maes | 704/231 |
| 6,122,615 A | * | 9/2000 | Yamamoto | 704/252 |
| 6,453,289 B1 | * | 9/2002 | Ertem et al. | 704/225 |
| 6,598,016 B1 | * | 7/2003 | Zavoli et al. | 704/251 |
| 6,771,701 B1 | * | 8/2004 | Klindworth et al. | 375/232 |
| 6,839,670 B1 | | 1/2005 | Stammler et al. | |

(Continued)

FOREIGN PATENT DOCUMENTS

DE    195 33 541 C1    3/1997
(Continued)

OTHER PUBLICATIONS

Herbordt, W. and Kellerman, W.: "Adaptive beamforming for audio signal acquisition," in "Adaptive signal processing: applications to real-world problems", p. 155, Springer, Berlin 2003.

(Continued)

*Primary Examiner* — Eric Yen
(74) *Attorney, Agent, or Firm* — Sunstein Kann Murphy & Timbers LLP (57) ABSTRACT

A speech dialog system interfaces a user to a computer. The system includes a signal pre-processor that processes a speech input to generate an enhanced signal and an analysis signal. A speech recognition unit may generate a recognition result based on the enhanced signal. A control unit may manage an output unit or an external device based on the information within the analysis signal.

23 Claims, 5 Drawing Sheets

U.S. PATENT DOCUMENTS

| | | | |
|---|---|---|---|
| 7,016,837 B2* | 3/2006 | Seo et al. ................ 704/233 |
| 7,167,544 B1 | 1/2007 | Bauer et al. |
| 7,664,313 B1* | 2/2010 | Sproat ..................... 382/154 |
| 7,835,908 B2* | 11/2010 | Choi et al. ............... 704/233 |
| 2002/0141599 A1* | 10/2002 | Trajkovic et al. ........ 381/71.6 |
| 2003/0061037 A1* | 3/2003 | Droppo et al. ........... 704/226 |
| 2004/0064314 A1* | 4/2004 | Aubert et al. ............ 704/233 |
| 2004/0064315 A1* | 4/2004 | Deisher et al. ........... 704/233 |
| 2004/0127198 A1* | 7/2004 | Roskind et al. ........ 455/412.2 |
| 2004/0172247 A1* | 9/2004 | Yoon et al. .............. 704/251 |
| 2004/0193411 A1* | 9/2004 | Hui et al. ................. 704/233 |
| 2006/0241916 A1* | 10/2006 | Sieracki ................... 702/189 |

FOREIGN PATENT DOCUMENTS

| | | |
|---|---|---|
| DE | 199 56 747 C1 | 1/2001 |
| EP | 1 695 873 A | 8/2006 |

OTHER PUBLICATIONS

Aust, H. et al.: "Overview of the Philips Dialog System", Proceedings of the Darpa Broadcast News Transcription and Understanding Workshop, Feb. 1998, XP002142224.

\* cited by examiner

SPEECH DIALOG CONTROL BASED ON SIGNAL PRE-PROCESSING

PRIORITY CLAIM

This application claims the benefit of priority from European Patent Application No. 06025974.4, filed Dec. 14, 2006, which is incorporated by reference.

BACKGROUND OF THE INVENTION

1. Technical Field

This application relates to speech dialog systems and, more particularly, to speech dialog control based on signal pre-processing.

2. Related Art

Speech dialog systems provide users with the ability to verbally communicate with a computer. When engaging a speech dialog system, a user may speak a word or series of words to bring about an intended result. The speech dialog system may receive these spoken words and determine possible available actions that are associated with the detected words. If the detected words represent a valid command in the speech dialog system, then the speech dialog system may implement the associated command.

Speech dialog systems may provide a fast and efficient method of communication. The benefits of such systems, however, may be lost when the speech dialog system has trouble converting spoken words into associated commands. The reliability of speech dialog systems may drop in noisy environments, such as in a vehicle. To improve reliability, speech dialog systems may process the speech input signals with noise reduction or echo compensation filters before analyzing the spoken words. These efforts alone may not be enough to provide a reliable communication interface between a user and a computer. Therefore, a need exists for a speech dialog system that allows for a faster and more reliable human-machine interaction.

SUMMARY

A speech dialog system interfaces a user to a computer. The system includes a signal pre-processor that processes a speech input to generate an enhanced signal and an analysis signal. A speech recognition unit may generate a recognition result based on the enhanced signal. A control unit may manage an output unit or an external device based on the information within the analysis signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A speech dialog system provides a verbal interface between a user and a computer. The system may comprise a signal pre-processor unit that receives and processes a speech input signal and generates an enhanced speech signal and an analysis signal. In some systems, the signal pre-processor unit may create the enhanced speech signal by dampening or removing noise and/or echo components from the received speech input signal. The signal pre-processor may create the analysis signal to convey information related to certain non-semantic characteristics of the speech input signal to a control unit. In some systems, the analysis signal may comprise information related to one or more of the following non-semantic characteristics: (1) a noise component of the speech input signal; (2) an echo component of the speech input signal; (3) a location of a source of the speech input signal; (4) a volume level of the speech input signal; (5) a pitch of the speech input signal; and/or (6) a stationarity of the speech input signal. A speech recognition unit of the speech dialog system may receive the enhanced speech signal and generate a recognition result based on the enhanced speech signal. A control unit may receive the analysis signal and may control an output unit or an external device based at least in part on the information received in the analysis signal. Specifically, the control unit may control an output unit or an external device based on the analysis signal, or based on both the information within the analysis signal and the recognition result.

Figure 1:
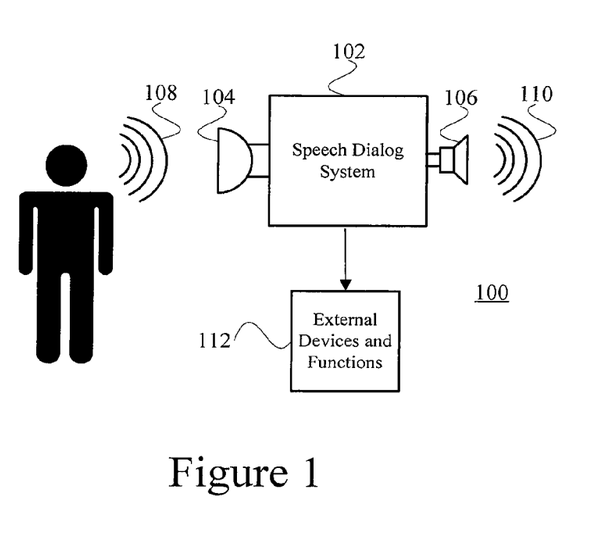
FIG. 1 is a system that includes speech dialog control based on signal pre-processing.

FIG. 1 is a diagram of a system 100 that includes speech dialog control based on signal pre-processing. In FIG. 1, a speech dialog system 102 comprises an input unit 104 and an output unit 106. The input unit 104 may receive voiced or unvoiced speech input signals 108 from a user that may represent one or more commands that may be executed by the speech dialog system 102. The output unit 106 may receive information from the speech dialog system 102 and may output messages 110 to a user. The output unit 106 may comprise a loudspeaker, a display, or other audio/visual device. In some systems, the output messages may comprise synthesized speech. In other systems, the output messages may comprise visual messages.

The input unit 104 may comprise a device/sensor that converts acoustic signals into analog or digital data. In some systems, the input unit 104 may be a microphone. In other systems, the input unit 104 may comprise a plurality of microphones. In yet other systems, the input device 104 may comprise a plurality of microphones arranged in a microphone array. One or more of the microphones in the array may be directional microphones. When the input unit 104 comprises multiple microphones, the speech input signal 108 may be beamformed to determine a location of a source of a speech input signal 108. A beamformer may provide information on the location of the user of a speech dialog system 102, such as whether the user is a driver or passenger. This information may identify the user as a passenger in the front seat or a rear seat. A beamformer may also provide information on the location of a disturbance source. The speech dialog system 102 may use this information to improve the human-machine dialog.

In addition to providing an audible or visual response to the user, the speech dialog system 102 may also interface with one or more external devices 112 through a physical or wireless connection. A user may use the speech dialog system 102 to control or make adjustments to external devices 112. The external devices 112 may be mechanical devices or electronic devices separate from the speech dialog system 102.

The speech dialog system 102 may be incorporated within a vehicle, such as a device that transports persons or things. When the speech dialog system 102 is used in a vehicle, a user may control various external devices 112, such as a mobile phone, a stereo, a navigation system, a movable seat, a movable mirror, a heater/air conditioner, or other devices.

Figure 2:
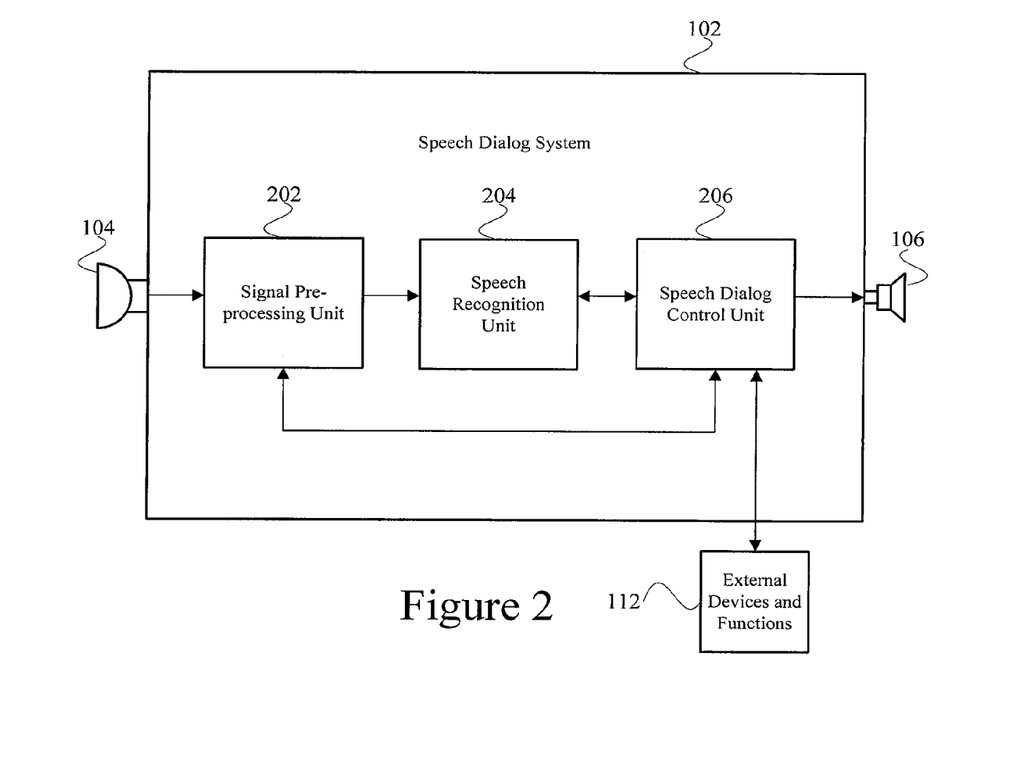
FIG. 2 is a second system that includes speech dialog control based on signal pre-processing.

FIG. 2 is a second diagram of a system that includes speech dialog control based on signal pre-processing. The speech dialog system 102 may comprise a signal pre-processor unit 202 that processes the speech input signal and generates an enhanced speech signal and an analysis signal. When an enhanced speech signal is received, the speech recognition unit 204 generates a recognition result. The control unit 206 may control the output unit 106 or an external device 112. In some systems, the control is based on the recognition result. In other systems, the control is based at least in part on information received in the analysis signal. In yet other systems, the control is based on a combination of the information of the analysis signal and the recognition result.

The speech dialog system 102 provides a communication path between the signal pre-processor unit 202 and the control unit 206. The communication path may be bi-directional such that the signal pre-processor unit 202 may transmit information to the control unit 206, and the control unit 206 may transmit information/commands to the signal pre-processor unit 202. The signal pre-processor unit 202 and the control unit 206 may directly communicate with each other or may communicate through an intervening unit. In some systems, the communication between the signal pre-processor unit 202 and the control unit 206 comprises an automatic feature enabled when the speech dialog system 102 is operational. In other systems, the communication between the signal pre-processor unit 202 and the control unit 206 comprises a feature that is enabled upon request by the user.

The speech dialog system 102 may also provide a communication path between the speech recognition unit 204 and the control unit 206. The communication path may be bi-directional such that the speech recognition unit 204 may transmit a recognition result to the control unit 206, and the control unit 206 may transmit information/commands to the speech recognition unit 204. The speech recognition unit 204 and the control unit 206 may communicate directly with each other or may communicate through an intervening unit. In some systems, the communication from the control unit 206 to the speech recognition unit 204 comprises an automatic feature enabled when the speech dialog system 102 is operational. In other systems, the communication from the control unit 206 to the speech recognition unit 204 comprises a feature that is enabled upon request by the user.

Figure 3:
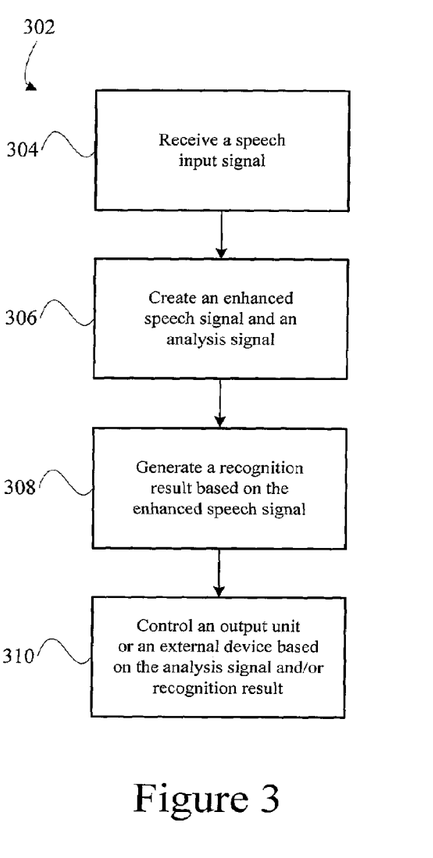
FIG. 3 is a method of operating a speech dialog system based on signal pre-processing.

FIG. 3 is a method of operating a speech dialog system based on signal pre-processing. Logic 302 illustrates the speech dialog system 102 controlling an output unit 106 or an external device 112 based on information related to one or more non-semantic characteristics of a speech input signal. At act 304, the speech dialog system 102 receives a speech input signal from a user at the input unit 104. The input unit 104 may comprise one or more microphones to detect the speech input signal from the user. The speech input signal may be represented as x(n), where "n" denotes a discrete time index. The speech input signal may comprise a desired signal representing a detected utterance of a user, background noise, and/or an echo contribution. The echo contribution may be due to an output signal detected by the input unit 104.

At act 306, the signal pre-processor unit 202 creates an enhanced speech signal and an analysis signal from the received speech input signal. The signal pre-processor unit 202 may generate the enhanced speech signal by removing the noise and echo components from the received speech input signal. The signal pre-processor unit 202 may generate the analysis signal to convey certain non-semantic characteristics of the speech input signal to the control unit 206. The analysis signal may comprise information related to one or more of the following non-semantic characteristics: (1) a noise component of the speech input signal; (2) an echo component of the speech input signal; (3) a location of a source of the speech input signal; (4) a volume level of the speech input signal; (5) a pitch of the speech input signal; and/or (6) a stationarity of the speech input signal. The signal pre-processor unit 202 may analyze the received speech input signal to determine what information relating to the non-semantic characteristics to include in the analysis signal. Alternatively, the signal pre-processor unit 202 may analyze the enhanced speech signal to determine what information relating to the non-semantic characteristics to include in the analysis signal.

The information of the analysis signal may be represented by probability measures for various properties (e.g., noise, echo, speech volume level) of the speech input signal. In some systems, the probability measure used for the speech volume level may indicate the probability that the operator should speak louder in order to improve the reliability of the speech recognition result. In other systems, the probability measure for noise may indicate the probability of environmental conditions near a user. The analysis signals may represent real numbers that are normalized to the interval between approximately zero and approximately one.

The signal pre-processor unit 202 may comprise one or more filters that process the speech input signal. The speech input signal may include some background noise and/or echo contribution in addition to the desired signal representing the utterance of a user. The filters of the signal pre-processor unit 202 may comprise noise reduction and/or echo compensation filters that may modify the speech input signal into an enhanced speech signal which may then have lower levels of background noise and/or echo than the speech input signal.

The signal pre-processor unit 202 may comprise an adaptive noise reduction filter. The noise reduction filter may determine an instantaneous power density spectrum of the speech input signal and a power density spectrum of the background noise that is present in the speech input signal in order to adapt the filter coefficients. By averaging the power density spectrum of the background noise, the signal pre-processor unit 202 may determine a mean noise level of the speech input signal. The signal pre-processor unit 202 may then provide information about the noise level to the control unit 206 in an analysis signal.

The signal pre-processor unit 202 may also extract the power density spectrum of the speech input signal. The signal pre-processor unit 202 may average this spectrum over a predetermined frequency range, such as from about 500 Hz to about 5000 Hz, and may smooth spectrum in time. In some systems, the signal pre-processor unit 202 only smoothes the signal portions that include the desired speech contribution. The signal pre-processor unit 202 may use the averaged and smoothed spectrum to determine the relative volume of the desired signal.

In some systems, the signal pre-processor unit 202 sends out separate signals. Specifically, the signal pre-processor unit 202 may send the enhanced speech signal to the speech recognition unit 204 and the analysis signal to the control unit 206.

At act 308, the speech recognition unit 204 generates a recognition result based on the enhanced speech signal received from the signal pre-processor unit 202. In some systems, the speech recognition unit 204 may not use the analysis signal to generate the recognition result. The speech recognition unit 204 may subject the enhanced speech signal to a spectral analysis. Representations of the speech waveforms may be sampled at a rate between about 6.6 kHz and about 20 kHz, and may be derived from the short term power spectra and represent a sequence of characterizing vectors containing values of features/feature parameters. The values of the feature parameters may be used in succeeding stages to estimate the probability that the portion of the analyzed waveform corresponds to a particular entry (e.g., a word) in a vocabulary list that is stored in a database of the speech dialog system 102.

The speech recognition unit 204 may make use of a concatenation of allophones that constitute a linguistic word. The allophones may be represented by Hidden Markov Models (HMM) that are characterized by a sequence of states each of which has a well-defined transition probability. In order to recognize a spoken word, the speech recognition unit 204 computes the most likely sequence of states through the HMM. This calculation may be performed through use of the Viterbi algorithm, which iteratively determines the most likely path through the associated trellis. The processing of the detected speech signal may be influenced and/or controlled by the recognition result. One recognition process may be controlled by a recognition result generated in a previous recognition process.

At act 310, the control unit 206 controls an output unit 106 or an external device 112 based on the analysis signal and/or the recognition result. The control unit 206 may receive an analysis signal from the signal pre-processor unit 202 and a recognition result from the speech recognition unit 204. The control unit 206 may determine which action to take based on the analysis signal alone or a combination of the analysis signal and the recognition result. The control unit 206 may use the output unit 106 to output synthesized speech to the user. Alternatively, the control unit 206 may control an external device 112, such as a controllable device in a vehicle.

Figure 4:
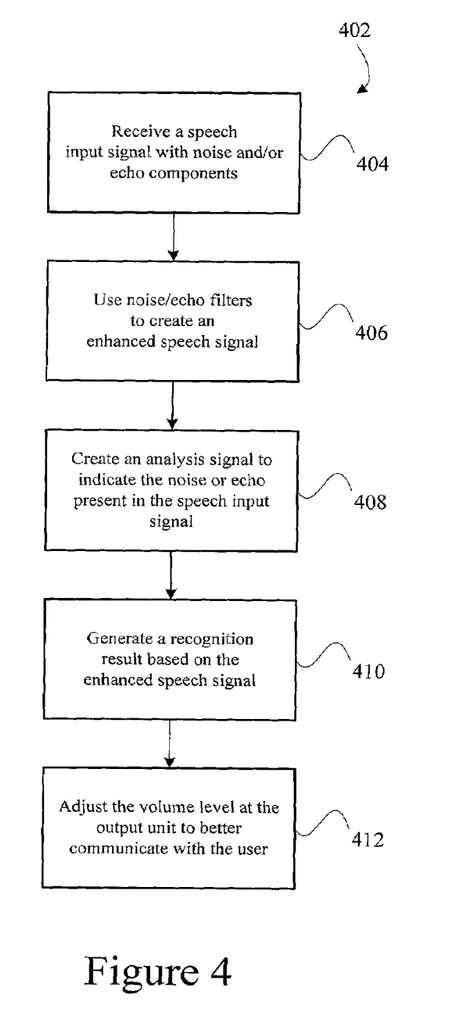
FIG. 4 is a second method of operating a speech dialog system based on signal pre-processing.

FIG. 4 is a second method of operating a speech dialog system based on signal pre-processing. Logic 402 illustrates the speech dialog system 102 adjusting a volume level of an output unit 106 or an external device 112 based on the noise or echo level detected in a speech input signal. At act 404, the speech dialog system 102 receives a speech input signal from a user. The speech input signal may have a large noise or echo component.

At act 406, the signal pre-processor unit 202 creates an enhanced speech signal. The signal pre-processor unit 202 may comprise a noise filter, such as an adaptive noise filter, to remove a noise component from the speech input signal. The noise filter may comprise a Wiener filter. The signal pre-processor unit 202 may also comprise an echo compensation filter to remove an echo component from the speech input signal. The filtered signal (or alternatively the detected non-filtered speech signal) is analyzed for a residual noise/echo level (or a noise/echo level present in the non-filtered signal).

At act 408, the signal pre-processor unit 202 creates an analysis signal. Specifically, the signal pre-processor unit 202 may create an analysis signal that includes information regarding the noise or echo present in the speech input signal. At act 410, the speech recognition unit 204 generates a recognition result based on the enhanced speech signal.

At act 412, the control unit 206 controls the output unit 106 or an external device 112 based on the information received from the signal pre-processor unit 202 in the analysis signal. The control unit 206 may use the information received from the signal pre-processor unit 202 in the analysis signal to determine whether the noise or echo levels exceed a predetermined threshold. The control unit 206 may increase the volume level at the output unit 106 or external device 112 to better communicate with the user in the noisy environment. Alternatively, the control unit 206 may decrease the volume level at the output unit 106 to better communicate with the user if echo is problematic.

Rather than adjusting an output volume, the control unit 206 could control the user-machine dialog to be carried out at a slower than standard pace in order to improve the reliability of the recognition result generated by the speech recognition unit 204 in a noisy or echo-filled environment. The control unit 206 may ask the user to speak more slowly. Alternatively, the control unit 206 may adapt the speed of the synthesized speech output based on the detected noise level, echo level, and/or speech level of the speech input signal.

Figure 5:
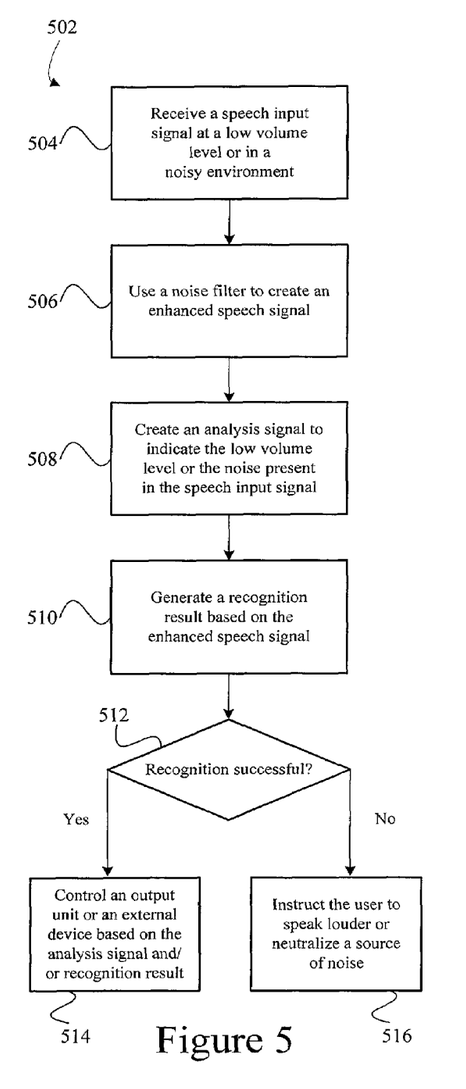
FIG. 5 is a third method of operating a speech dialog system based on signal pre-processing.

FIG. 5 is a third method of operating a speech dialog system based on signal pre-processing. Logic 502 illustrates the speech dialog system 102 instructing a user to speak louder or reduce/eliminate/take corrective action against (e.g., neutralize) a source of noise based on the volume or noise level detected in a speech input signal. At act 504, the speech dialog system 102 receives a speech input signal from a user. The speech input signal may have a large noise component, or the user's utterance may be at a low speaking volume.

At act 506, the signal pre-processor unit 202 creates an enhanced speech signal. The signal pre-processor unit 202 may comprise a noise filter, such as an adaptive noise filter, to remove a noise component from the speech input signal. At act 508, the signal pre-processor unit 202 creates an analysis signal. Specifically, the signal pre-processor unit 202 may create an analysis signal that includes information regarding the volume level of the user's utterance or the noise present in the speech input signal. At act 510, the speech recognition unit 204 generates a recognition result based on the enhanced speech signal.

At act 512, the control unit 206 determines whether the speech recognition unit 204 successfully located a recognition result for the speech input signal. If the speech recognition unit 204 located a recognition result, the control unit 206 controls the output unit 106 based on the recognition result and/or information received from the signal pre-processor unit 202 in the analysis signal at act 514. If the speech recognition unit 204 was unable to locate a recognition result, the control unit 206 may transmit an output message through the output unit 106 to instruct the user to speak louder or to neutralize the source of the noise at act 516. In some systems, the control unit 206 may analyze the information received from the signal pre-processor unit 202 to determine whether the noise level is above a predetermined threshold or the volume level is below a predetermined threshold. When a predetermined threshold is violated, the control unit 206 may generate a synthesized speech output, such as "please speak louder." Alternatively, the control unit 206 may generate a synthesized speech output, such as "please close the window." In other systems, a specific window that is contributing to the noise may be identified. In still yet other systems, different noise sources may be generally or specifically identified. Thus, if some malfunction of the speech dialog system 102 is to be expected due to a low speech level (and accordingly due to a somewhat unreliable speech recognition), the speech dialog system 102 may interact with the user in a way to improve the intelligibility of the user's utterances.

Figure 6:
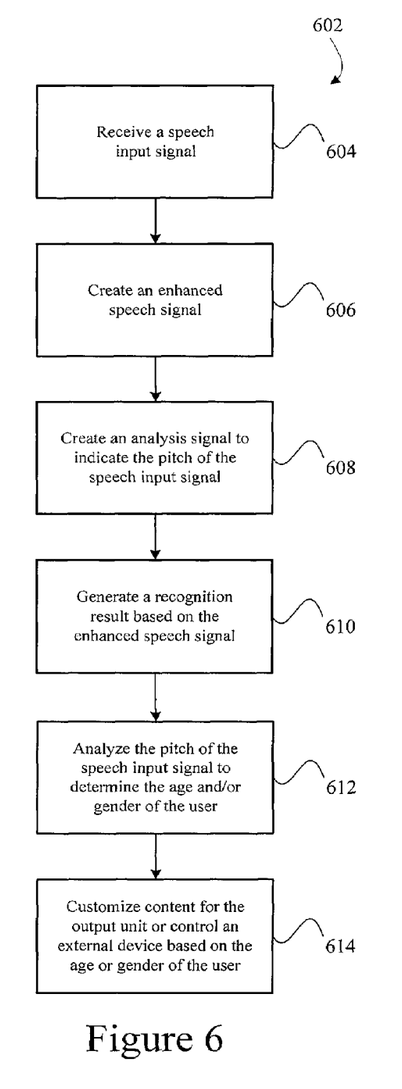
FIG. 6 is a fourth method of operating a speech dialog system based on signal pre-processing.

FIG. 6 is a fourth method of operating a speech dialog system based on signal pre-processing. Logic 602 illustrates the speech dialog system 102 determining the age or gender of a user based on the pitch of a speech input signal. At act 604, the speech dialog system 102 receives a speech input signal from a user.

At act 606, the signal pre-processor unit 202 creates an enhanced speech signal. At act 608, the signal pre-processor unit 202 creates an analysis signal. Specifically, the signal pre-processor unit 202 may create an analysis signal that includes information regarding the pitch frequency of the voice component of the speech input signal. At act 610, the speech recognition unit 204 generates a recognition result based on the enhanced speech signal.

At act 612, the control unit 206 analyzes the pitch of the speech input signal to determine the age and/or gender of the speaker. This analysis may be performed by determining an instantaneous pitch frequency averaged over a predetermined time interval. If the averaged pitch frequency is less than a predetermined value, then the control unit 206 may determine that the speaker is male. In some systems, this predetermined value may be about 150 Hz. If the averaged pitch frequency is above this predetermined value, then the control unit 206 may determine that the speaker is female or a child. If the averaged pitch frequency is greater than a second predetermined threshold, then the control unit 206 may determine that the speaker is a child. In some systems, this second predetermined value may be about 300 Hz. In other systems, the control unit 206 may use other pitch range limits to determine whether the speaker is male, female, or a child.

At act 614, the control unit 206 customizes content for the output unit 106 or controls an external device 112 based on the age or gender of the user. In some systems, the control unit 206 may transmit an output message to the output unit 106 to play a synthesized speech output to the user that is customized based on the determined age or gender of the user. In other systems, the control unit 206 may activate a child safety device upon detection of a voice input signal with a pitch within a child's pitch range.

Figure 7:
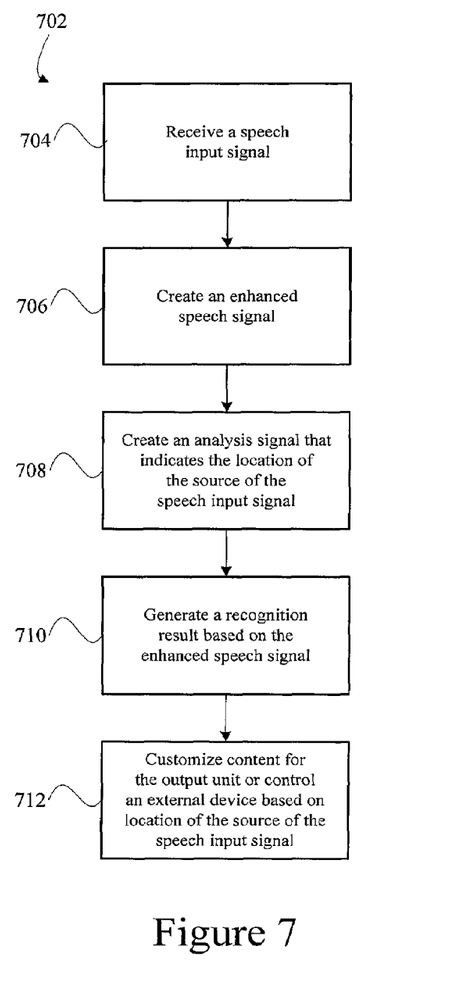
FIG. 7 is a fifth method of operating a speech dialog system based on signal pre-processing.

FIG. 7 is a fifth method of operating a speech dialog system based on signal pre-processing. Logic 702 illustrates the speech dialog system 102 customizing content for the output unit 106, or controlling an external device 112, based on a detected location of a source of a speech input signal. At act 704, the speech dialog system 102 receives a speech input signal from a user.

At act 706, the signal pre-processor unit 202 creates an enhanced speech signal. At act 708, the signal pre-processor unit 202 creates an analysis signal. Specifically, the signal pre-processor unit 202 may create an analysis signal that includes information regarding a detected location of the source of the speech input signal. The signal pre-processor unit 202 may determine the location of the source of the speech input through a beamformer and signals from a plurality of microphones. Beamforming comprises amplification of microphone signals corresponding to audio signals detected from a wanted signal direction by equal phase addition and attenuation of microphone signals corresponding to audio signals generated at positions in other directions. The beamforming might be performed by a fixed beamformer or an adaptive beamformer characterized by a permanent adaptation of processing parameters such as filter coefficients during operation. The location of the speaker/user of the speech dialog system 102 may be determined on the basis of the difference in signal transit time of microphone signals of the individual microphones.

At act 710, the speech recognition unit 204 generates a recognition result based on the enhanced speech signal. At act 712, the control unit 206 customizes content for the output unit 106 or controls an external device 112 based on the detected location of the source of the speech input signal. Customized content may include the control unit 206 outputting a synthesized speech output that partly depends on the location of the user. This output may enable the speech dialog system 102 to provide the user with information by left/right/ahead/behind indications in dependence on the determined position of the speaker. In some instances, the control unit 206 may provide synthesized phrases/sentences based on the detected location information, such as: "On your left/right you will see/find X." Alternatively, when a driver simply utters a command that is location dependant, such as "seat heater on" or "adjust mirror," the control unit 206 may use the location information of the user to perform the desired command and activate any associated devices. Specifically, if it is detected that the user requesting the seat heater is sitting in the driver's seat, the control unit 206 may activate the seat heater located in the driver's seat. The speech dialog system 102 may determine the desired information automatically from the detected location of the user.

In other instances, the user may ask that certain information be displayed on a display device. In situations where there is more than one display device in the room/area where the speech dialog system 102 is installed, the control unit 206 may analyze the detected location of the user to activate the display device that is next to, or closest to, the user. Where a display comprises single multi-display monitor, information may be represented on the display that is in the line of sight of the user.

Figure 8:
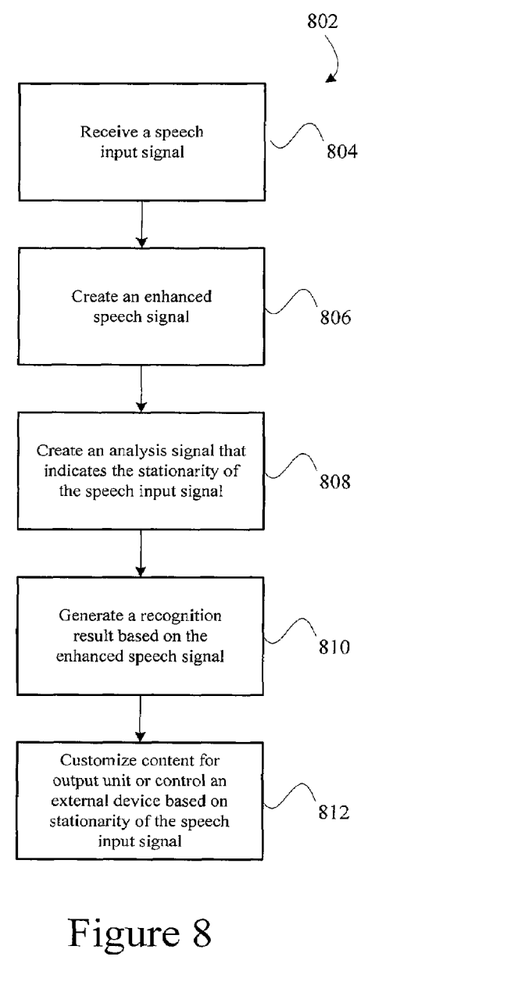
FIG. 8 is a sixth method of operating a speech dialog system based on signal pre-processing.

FIG. 8 is a sixth method of operating a speech dialog system based on signal pre-processing. Logic 802 illustrates the speech dialog system 102 customizing content for the output unit 106, or controlling an external device 112, based on a detected stationarity of a speech input signal. At act 804, the speech dialog system 102 receives a speech input signal from a user. At act 806, the signal pre-processor unit 202 creates an enhanced speech signal. At act 808, the signal pre-processor unit 202 creates an analysis signal. Specifically, the signal pre-processor unit 202 may create an analysis signal that includes information regarding the stationarity of the speech input signal. The signal pre-processor unit 202 may detect that some non-stationary portion of a noisy speech signal is caused by a perturbation source. The signal pre-processor unit 202 may identify the noise source by a comparison of the non-stationary signal portion with noise samples stored in a database.

The signal pre-processor unit 202 may detect whether the speech signal exhibits significant time variations. In particular, the signal pre-processor unit 202 may determine whether the speech signal has non-stationary contributions of perturbations stemming from a direction different from the one of the source of the desired speech signal (e.g., the location of the speaker). The non-stationary contributions may include utterances by other persons that are not actually operating the speech dialog system 102. The signal pre-processor unit 202 may determine the direction of the source of the perturbations and the speaker through use of a beamformer.

At act 810, the speech recognition unit 204 generates a recognition result based on the enhanced speech signal. At act 812, the control unit 206 customizes content for the output unit 106 or controls an external device 112 based on the stationarity of the speech input signal. The control unit 206 may prompt the operator to eliminate or switch-off a perturbation detected based on the stationarity of the speech input signal. If detected non-stationary perturbations are above a predetermined threshold and information regarding this fact is provided to the control unit 206, then the control unit 206 may transmit an output message to the output unit 106 to prompt the user with a warning that speech recognition might fail due to the perturbation. The speech dialog system 102 may also identify non-stationary verbal perturbations caused by a second speaker. In this case, the control unit 206 may send and output message to the output unit 106 to ask the second speaker to wait for the completion of the interaction between the first speaker and the speech dialog system 102.

Figure 9:
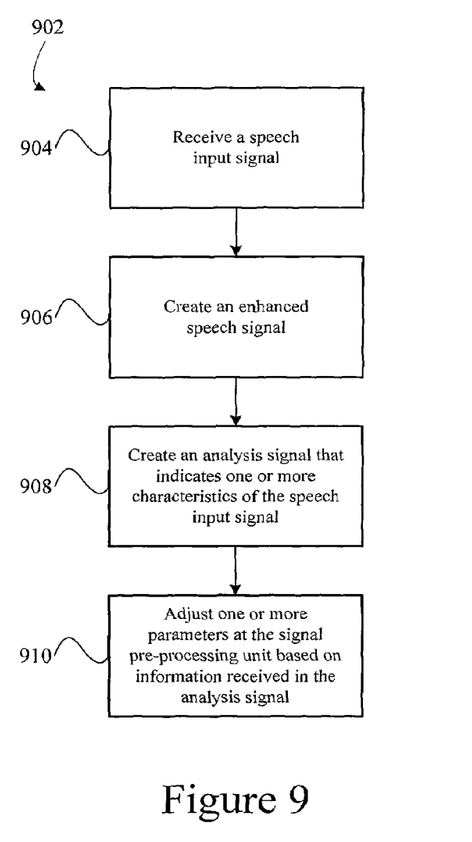
FIG. 9 is a seventh method of operating a speech dialog system based on signal pre-processing.

FIG. 9 is a seventh method of operating a speech dialog system based on signal pre-processing. Logic 902 illustrates the control unit 206 adjusting one or more parameters of the signal pre-processor unit 202 based on an analysis signal that comprises information related to one or more non-semantic characteristics of a speech input signal. At act 904, the speech dialog system 102 receives a speech input signal from a user.

At act 906, the signal pre-processor unit 202 creates an enhanced speech signal. At act 908, the signal pre-processor unit 202 creates an analysis signal. Specifically, the signal pre-processor unit 202 may create an analysis signal that includes information related to one or more non-semantic characteristics of the speech input signal.

The speech signal may comprise some echo contribution. The echo contribution may be caused by output from the output unit 106, such as a synthesized speech output in a loudspeaker-room-microphone system (LRM). Filter coefficients of an echo compensation filter may be adapted in order to estimate the impulse response of the LRM and to subtract an estimate for the echo from the speech signal. The echo compensation filter may be a finite impulse response (FIR) filter adapted by the Normalized Least Mean Square algorithm. In addition to the echo compensation, the speech input signal may be further processed before the signal is ready for speech recognition.

At act 910, the control unit 206 may review the information of the analysis signal and decide to adjust one or more parameters used at the signal pre-processor unit 202. The signal pre-processor unit 202 may comprise a noise reduction filter configured to determine background noise that is present in the speech input signal and/or an echo compensation filter configured to determine an echo component that is present in the speech input signal. These filters may enhance the quality of the speech input signal before speech recognition. The noise and echo filters may have one or more adjustable coefficients. The control unit 206 may adjust these filter coefficients at the signal pre-processor unit 202 based on the information received in the analysis signal.

In one instance, the control unit 206 may send a control signal to the echo compensation filter of the signal pre-processor unit 202 in response to a recognition result received from the speech recognition unit 204. The recognition result may indicate that the user is about to change location. A significant movement of the speaker may result in a change of the actual impulse response of the LRM. Therefore, when the control unit 206 determines that some movement of the speaker is to be expected, the control unit 206 may adjust the echo compensation filter accordingly. This control of the echo compensation filter by the control unit 206 may avoid some "freezing" of the filter coefficients of the echo compensation filter.

In another instance, the user of the speech dialog system 102 may intend to operate some device, such as a seat heater or a mirror. The user may utter "seat heater" or "right exterior mirror." After the speech dialog system 102 recognizes the user's command, the speech dialog system 102 may prompt the user with the following synthesized voice message: "please operate illuminated switch to the left." It may be likely at this point that the user will move to the left to operate the switch. To account for the temporal change of the LRM caused by the user's expected movement the control unit 206 may re-adapt the filter coefficients of the echo compensation filter. The control unit 206 may provide a similar adjustment to the echo compensation filter upon determination that the user has requested the speech dialog control system 102 to move the position of the user's seat. This control may be performed on the basis of the semantic context of the actual dialog.

In yet another instance, the speech dialog system 102 may estimate the probability that the user might start speaking shortly. If, e.g., a synthesized speech output represents an answer to a question previously asked by the user of the speech dialog system 102, it may be likely that the user will speak again (depending on the kind of answer). If, on the other hand, the synthesized speech output takes relatively long there may be an increasing probability during the synthesized speech output that the operator might interrupt the speech output by barging-in. The control unit 206 may provide the signal pre-processor unit 206 information on this probability. The control unit 206 may adapt thresholds of a noise reduction filter, an echo compensation filter, and/or a residual echo compensation filter in accordance with the probability that the operator might start speaking. The control unit 206 may also control adaptation steps for the filter coefficients of the echo compensation filter in accordance with the expectation of some barge-in.

Figure 10:
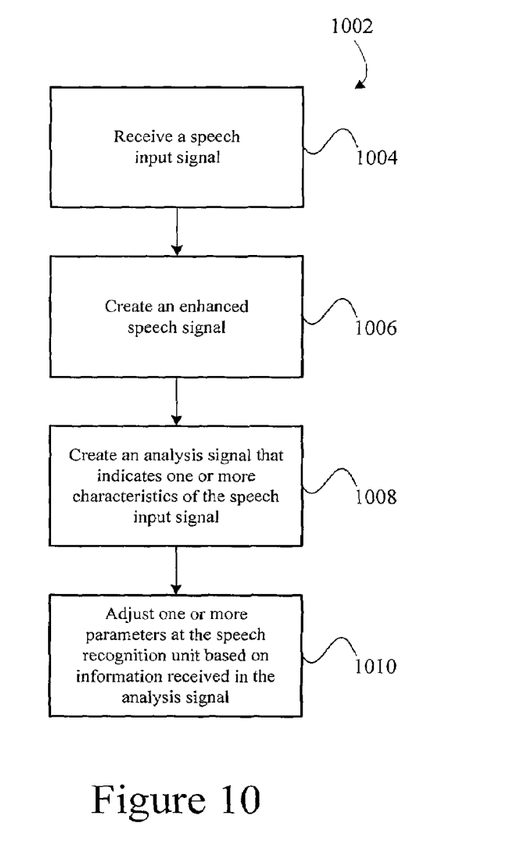
FIG. 10 is an eighth method of operating a speech dialog system based on signal pre-processing.

FIG. 10 is an eighth method of operating a speech dialog system based on signal pre-processing. Logic 1002 illustrates the control unit 206 adjusting one or more parameters of the speech recognition unit 204 based on an analysis signal that comprises information related to one or more non-semantic characteristics of a speech input signal. At act 1004, the speech dialog system 102 receives a speech input signal from a user.

At act 1006, the signal pre-processor unit 202 creates an enhanced speech signal. At act 1008, the signal pre-processor unit 202 creates an analysis signal. Specifically, the signal pre-processor unit 202 may create an analysis signal that includes information related to one or more non-semantic characteristics of the speech input signal.

At act 1010, the control unit 206 may review the information of the analysis signal and decide to adjust one or more parameters used for speech recognition at the speech recognition unit 204. This control may be performed on the basis of the semantic context of the actual dialog in order to improve the reliability of the recognition process. The speech recognition unit 204 may have a plurality of different available code books to be used to recognize speech. The control unit 206 may select one of a plurality of available code books to be used by the speech recognition unit 204 based on the information related to the non-semantic characteristics of the speech input signal received in the analysis signal. The control unit 206 may select one of the plurality of available code books in response to a particular kind of speech input that may be expected in an actual dialog situation.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A speech dialog system, comprising:
a processor;
a signal pre-processor unit configured to process a speech input signal and generate an enhanced speech signal and an analysis signal, where the analysis signal comprises information related to one or more non-semantic characteristics of the speech input signal, the signal pre-processor unit outputting the analysis signal for speech dialog control;
a speech recognition unit configured to receive the enhanced speech signal and generate a recognition result containing one or more words spoken in the speech input signal based on the enhanced speech signal;
a speech output unit configured to output a synthesized speech output in response to the recognition result; and
a speech dialog control unit configured to receive the analysis signal and the recognition result, the speech dialog control unit configured to control the speech output unit based upon the received analysis signal, and the speech dialog control unit also configured to control the signal pre-processor unit based upon the on the recognition result.

2. The speech dialog system of claim 1, where the information related to one or more non-semantic characteristics of the speech input signal comprises information related to one or more of:
a noise component of the speech input signal;
an echo component of the speech input signal;
a location of a source of the speech input signal; a volume level of the speech input signal;
a pitch of the speech input signal; or
a stationarity of the speech input signal.

3. The speech dialog system of claim 1, where the speech input signal comprises a representation of one or more words spoken by a user; and
where the information of the analysis signal is unrelated to a meaning or identity of the one or more words spoken by the user.

4. The speech dialog system of claim 1, where the signal pre-processor unit is configured to determine a noise component of the speech input signal; and
where the analysis signal comprises information related to the noise component of the speech input signal.

5. The speech dialog system of claim 4, where the speech dialog control unit is configured to increase a volume of the speech output unit when the noise component of the speech input signal is above a predetermined threshold.

6. The speech dialog system of claim 4, where the speech dialog control unit is configured to generate an output message to instruct a user to neutralize a noise source when the noise component of the speech input signal is above a predetermined threshold.

7. The speech dialog system of claim 1, where the signal pre-processor unit is configured to determine an echo component of the speech input signal; and
 where the analysis signal comprises information related to the echo component of the speech input signal.

8. The speech dialog system of claim 1, where the signal pre-processor unit is configured to determine a location of a source of the speech input signal; and
 where the analysis signal comprises information related to the location of the source of the speech input signal.

9. The speech dialog system of claim 8, where the speech dialog control unit is configured to customize content for the speech output unit or control an external device based on the location of the source of the speech input signal.

10. The speech dialog system of claim 1, where the signal pre-processor unit is configured to determine a volume level of the speech input signal; and
 where the analysis signal comprises information related to the volume level of the speech input signal.

11. The speech dialog system of claim 1, where the signal pre-processor unit is configured to determine a pitch of the speech input signal; and
 where the analysis signal comprises information related to the pitch of the speech input signal.

12. The speech dialog system of claim 11, where the speech dialog control unit is configured to analyze the information related to the pitch of the speech input signal to determine an age or gender of a user that provided the speech input signal; and
 where the speech dialog control unit is configured to customize content for the speech output unit or control an external device based on the age or gender of the user.

13. The speech dialog system of claim 1, where the signal pre-processor unit is configured to determine a stationarity of the speech input signal; and
 where the analysis signal comprises information related to the stationarity of the speech input signal.

14. The speech dialog system of claim 1, where the speech dialog control unit is configured to use the information of the analysis signal to control the signal pre-processor unit.

15. The speech dialog system of claim 1, where the signal pre-processor unit comprises a noise reduction filter or an echo compensation filter; and
 where the speech dialog control unit is configured to adjust one or more parameters of the noise reduction filter or the echo compensation filter based on the information of the analysis signal.

16. The speech dialog system of claim 1, where the speech dialog control unit is configured to use the information of the analysis signal to control the speech recognition unit.

17. The speech dialog system of claim 1, where the speech recognition unit comprises a plurality of available code books for speech recognition; and
 where the speech dialog control unit is configured to select one of the plurality of code books to be used by the speech recognition unit based on the information of the analysis signal.

18. The speech dialog system of claim 1, further comprising:
 one or more microphones configured to detect the speech input signal, where the one or more microphones comprise one or more directional microphones; and
 where the signal pre-processor unit comprises a beamformer configured to determine a location of a source of the speech input signal.

19. The speech dialog system of claim 1, where the analysis signal comprises a real number between approximately zero and approximately one representing a probability measure for one of the one or more non-semantic characteristics of the speech input signal.

20. A speech dialog system, comprising:
 a processor;
 a signal pre-processor unit configured to process a speech input signal and generate an enhanced speech signal;
 a speech recognition unit configured to receive the enhanced speech signal and generate a recognition result containing one or more words spoken in the speech input signal based on the enhanced speech signal; and
 a speech dialog control unit configured to receive the recognition result, the speech dialog control unit configured to control the signal pre-processor unit based upon the recognition result.

21. The speech dialog system of claim 20, where the signal pre-processor unit comprises a noise reduction filter or an echo compensation filter; and
 where the speech dialog control unit is configured to adjust one or more parameters of the noise reduction filter or the-echo compensation filter of the pre-processor unit based on the recognition result.

22. A method, comprising the steps of:
 performing, via a processor, operations of:
 processing a speech input signal to generate an enhanced speech signal;
 analyzing the speech input signal or the enhanced speech signal to generate an analysis signal that comprises information related to one or more non-semantic characteristics of the speech input signal;
 generating a recognition result containing one or more words spoken in the speech input signal based on the enhanced speech signal;
 output, via a speech output unit, a synthesized speech output in response to the recognition result;
 controlling the speech output unit based on the information of the analysis signal; and
 adjusting one or more parameters used to process the speech input signal based on the recognition result.

23. A computer program product comprising a non-transitory computer readable medium having computer executable instructions executable by a computer for controls based on a speech dialog, the computer program product comprising:
 computer code for processing a speech input signal to generate an enhanced speech signal;
 computer code for analyzing the speech input signal or the enhanced speech signal to generate an analysis signal that comprises information related to one or more non-semantic characteristics of the speech input signal;
 computer code for generating a recognition result containing one or more words spoken in the speech input signal based on the enhanced speech signal;
 computer code for outputting, via a speech output unit, a synthesized speech output in response to the recognition result;
 computer code for controlling the speech output unit based on the information of the analysis signal; and
 computer code for adjusting one or more parameters used to process the speech input signal based on the recognition result.

* * * * *